US00RE45160E

(19) United States
(12) Reissued Patent
Ferlauto et al.

(10) Patent Number: US RE45,160 E
(45) Date of Reissued Patent: Sep. 23, 2014

(54) METHOD AND SYSTEM FOR MATCHING AND CONSOLIDATING ADDRESSES IN A DATABASE

(75) Inventors: Henry T. Ferlauto, Bridgehampton, NY (US); Stephen H. Yu, Bridgehampton, NY (US)

(73) Assignee: I-BR Technologies, L.L.C., Wilmington, DE (US)

(21) Appl. No.: 11/972,423

(22) Filed: Jan. 10, 2008

Related U.S. Patent Documents

Reissue of:
(64) Patent No.: 6,985,926
Issued: Jan. 10, 2006
Appl. No.: 09/942,525
Filed: Aug. 29, 2001

(51) Int. Cl.
*G06F 15/16* (2006.01)
*G06F 17/00* (2006.01)

(52) U.S. Cl.
USPC ..... 709/206; 707/692

(58) Field of Classification Search
USPC ..... 707/692; 709/206
See application file for complete search history.

(56) References Cited

U.S. PATENT DOCUMENTS

| | | | | |
|---|---|---|---|---|
| 5,111,395 | A * | 5/1992 | Smith et al. | 705/45 |
| 5,303,149 | A * | 4/1994 | Janigian | 707/999.007 |
| 5,717,915 | A * | 2/1998 | Stolfo et al. | 707/999.005 |
| 5,944,787 | A | 8/1999 | Zoken | |
| 5,978,791 | A | 11/1999 | Farber et al. | |
| 6,389,429 | B1 | 5/2002 | Kane et al. | |
| 6,711,624 | B1 | 3/2004 | Narurkar et al. | |
| 6,985,926 | B1 | 1/2006 | Ferlauto et al. | |
| 7,865,394 | B1 * | 1/2011 | Calloway et al. | 705/14.4 |
| 2002/0038312 | A1 * | 3/2002 | Donner et al. | 707/200 |
| 2003/0038312 | A1 * | 2/2003 | Mikolajick | 257/296 |
| 2005/0187794 | A1 * | 8/2005 | Kimak | 705/3 |

OTHER PUBLICATIONS

Norckauer, Duplicate Entry Detection in Mailing and Participation List, pp. 1-51, 1990.*
Sagent , Centrus/Purge pp. 1-31, 5/23/200.*
Rahm, Data Cleaning: Problems and Current Approaches, pp. 3-13, Dec. 2000.*
Matching Algorithms within a Duplicate Detection System, pp. 14-20, 12/20000.*
"Notice of Allowance", U.S. Appl. No. 09/942,525, filed Apr. 11, 2005, 9 pages.
David H. Crocker, Standard For The Format Of ARPA Internet Text Messages, Standard, Aug. 13, 1982, 45 pp, RFC #822, Dept. of Electrical Engineering, University of Delaware, Newark, DE 19711 USA (available online @ http://www.rfc-editor.org/rfc/rfc822.txt).

(Continued)

*Primary Examiner* — Larry Donaghue

(57) ABSTRACT

An address consolidating system that has a name and address database where duplicate names and address are consolidated by matching name and address and e-mail address simultaneously. The address consolidating system utilizes a database along with off-the-shelf and custom proprietary software. There are two segments to the database: records with name and address data (which may or may not include e-mail address data), and records with e-mail address data (which may include incomplete portions of associated name and address data). Periodically the database is updated with new or corrected name, address, or e-mail information, or with new records obtained from other database lists.

82 Claims, 8 Drawing Sheets

(56) References Cited

OTHER PUBLICATIONS

Ronald L. Rivest, The MD5 Message-Digest Algorithm, Memo, Apr. 1992, 19 pp, MIT Laboratory for Computer Science and RSA Data Security, Inc., Cambridge, MA 02139 USA (available online @ http://www.rfc-editor.org/rfc/rfc1321.txt).

Secure Hash Standard, Federal Information Processing Standards Publication 180-1, Apr. 17, 1995, 17 pp, FIPS PUB 180-1, USA (available online @ http://www.itl.nist.gov/fipspubs/fip180-1.htm).

df Power Match, User's Guide, 1998-2000, 104 pp, DataFlux Corporation, 4001 Weston Parkway, Suite 300, Cary, NC 27513, USA (www.dataflux.com).

df Power Studio, User's Guide, 1998-2000, 128 pp, DataFlux Corporation, 4001 Weston Parkway, Suite 300, Cary, NC 27513, USA (www.dataflux.com).

Consumer Merge/Purge, Reference Guide, Release 2.7, Dec. 1999, 28 selected pages, Group 1 Software, Inc.

Rodney Joffe, Merge/Purge and Deduplication of E-Mail Addresses, White Paper, 2000, 5 pp, Whitehat.com, LLC, (available online @ http://www.whitehat.com/whitehatpapers.cfm).

* cited by examiner

METHOD AND SYSTEM FOR MATCHING AND CONSOLIDATING ADDRESSES IN A DATABASE

Matter enclosed in heavy brackets [ ] appears in the original patent but forms no part of this reissue specification; matter printed in italics indicates the additions made by reissue.

FIELD OF THE INVENTION

This invention relates to databases, and more particularly, to a name and address database where duplicate names and address are consolidated by matching name and address and e-mail address simultaneously.

DETAILED DESCRIPTION OF THE INVENTION

In the marketing industry, name and address lists are bought and sold for various business purposes, including direct mail marketing. Most name and address lists are maintained in databases which need to be continually updated due to the fluid movement of people in our society. It is estimated that every year fifteen million families (roughly forty million individuals) and one million businesses move. In addition, new names and addresses are acquired from various sources and through differing methods to add names of potential customers to the lists. Duplicate names and addresses must be identified and removed from such lists in order to increase the value of the list and avoid duplicate mailings to the same households. Due to human and computer problems, errors can be introduced into any given name and address in a list, giving rise to duplicate names and addresses or nearly duplicate names and addresses. These errors coupled with the fluid movement of people in our society make maintaining and updating name and address databases a critical and ongoing task.

With the advent of the Internet and electronic mail, another avenue for identifying and reaching additional customers is now available. In the process of name and regular mail address acquisition, an e-mail address may be obtained in conjunction with a name and regular mail address, or obtained alone. For some marketing purposes, the e-mail address may be all that is required, but in others, the name and regular mail address are also needed. Prior to the present invention, it has been difficult to match e-mail address data with a corresponding name and regular mail address data. The present invention meets this need and other needs in the art.

Figure 1:
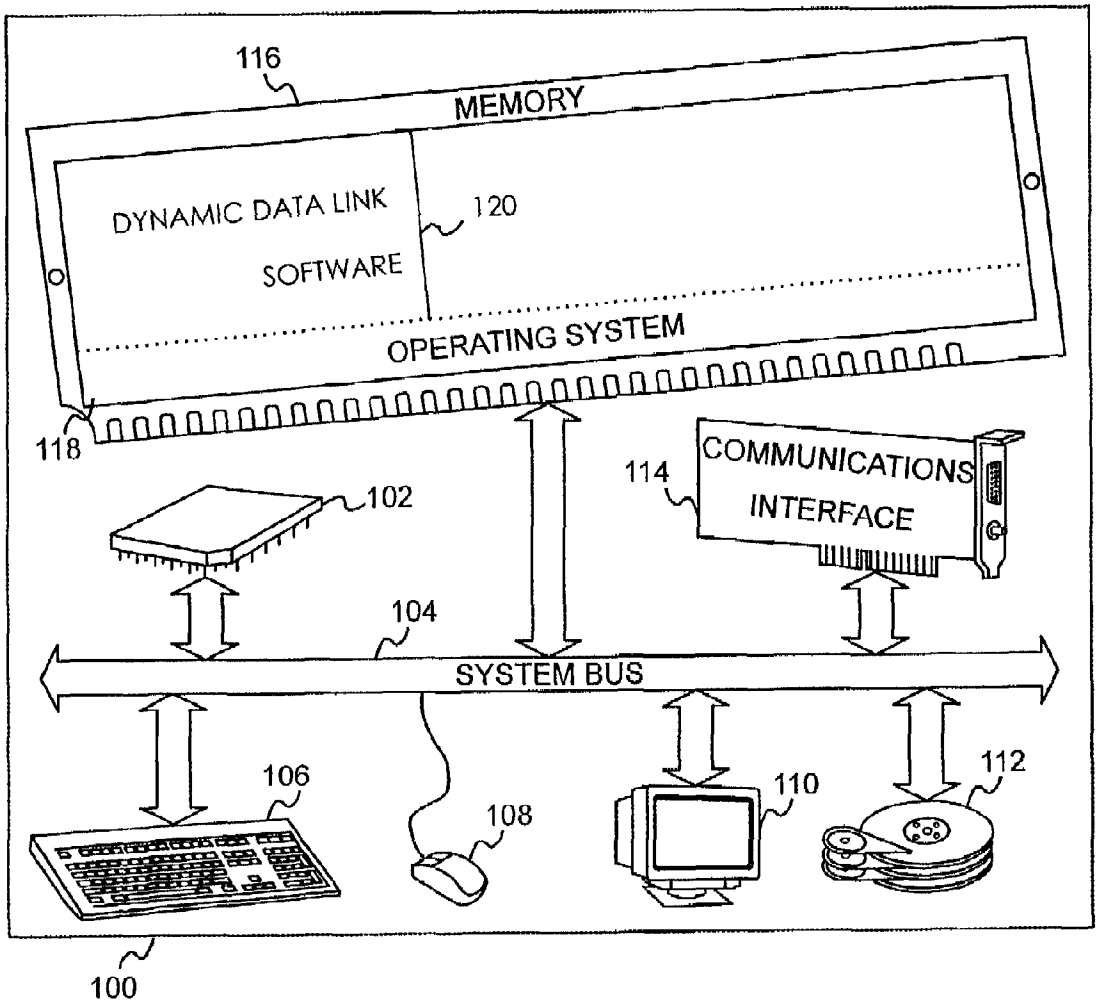
FIG. 1 shows a block diagram of an embodiment of a computer system incorporating the present invention.

FIG. 1 shows a block diagram of an embodiment of a computer system incorporating the Dynamic Data Link (DDL) Address Matching and Consolidating System of the present invention. One skilled in the art will recognize that the present invention may function on a mainframe computer system, a stand alone personal computer system, or a networked distributed computer system. The stand alone personal computer system shown in FIG. 1 is an exemplary embodiment.

Referring now to FIG. 1, a computer system 100 contains a processing element 102. The processing element 102 communicates to other elements of the computer system 100 over a system bus 104. A keyboard 106 allows a user of the computer system to input information into the computer system 100, and a graphics display 110 allows the computer system to output information to the user. A pointing device, such as mouse 108, is also used to input information. A storage device 112 is used to store data, including the Dynamic Data Link Database, and programs within the computer system 100. A memory 116, also attached to the system bus 104, contains an operating system 118 and the dynamic data link software 120, which includes off-the-shelf software components and custom proprietary software. A communications interface 114 is also attached to the system bus 104. Connectable through communications interface 114 may be an external printer or scanner, as well as access to a computer network or to the Internet (not shown in FIG. 1).

FIGS. 2A-2H show a block/flow diagram depicting the operation of aspects of the DDL Address Matching and Consolidating System according to embodiments of the present invention. The DDL Address Matching and Consolidating System utilizes a Dynamic Data Link Database along with the dynamic data link software 120, which includes off-the-shelf and custom proprietary software. There are two segments to the Dynamic Data Link Database: records with name and address data (which may or may not include e-mail address data), and records with e-mail address data (which may include incomplete portions of associated name and address data). Periodically the Dynamic Data Link Database is updated with new or corrected name, address, or e-mail information, or with new records obtained from other database lists. The DDL Address Matching and Consolidating System was designed to maximize the cohesiveness of marketing databases by accurately grouping online and offline behavioral records for the same individuals from various sources. Although similar to traditional Merge/Purge software solutions, the DDL Address Matching and Consolidating System automates database updating via a multi-tiered dynamic match process without high level programming resources, saving weeks off of a normal schedule. At the same time, the DDL Address Matching and Consolidating System returns consistent output based on pre-set business rules, which can be modified to an nth degree. The resultant buyer-centric databases facilitate statistical modeling tools to better predict consumer behavior and enable marketers to deliver true one-to-one messages to consumers.

The major steps of the DDL Address Matching and Consolidating System includes (1) preprocessing of outside files, (2) file conversions, (3) address standardization, (4) sort name and address transactions, (5) sort e-mail transactions with prior e-mail database, (6) match e-mail file to name and address file, (7) sort e-mail transactions with converted name and address transactions, (8) apply new transactions to the database, (9) consolidate the Dynamic Data Link Database, and (10) periodic NCOA (National Change of Address System) processing.

(1) Preprocessing of Outside Files

Figure 2A:
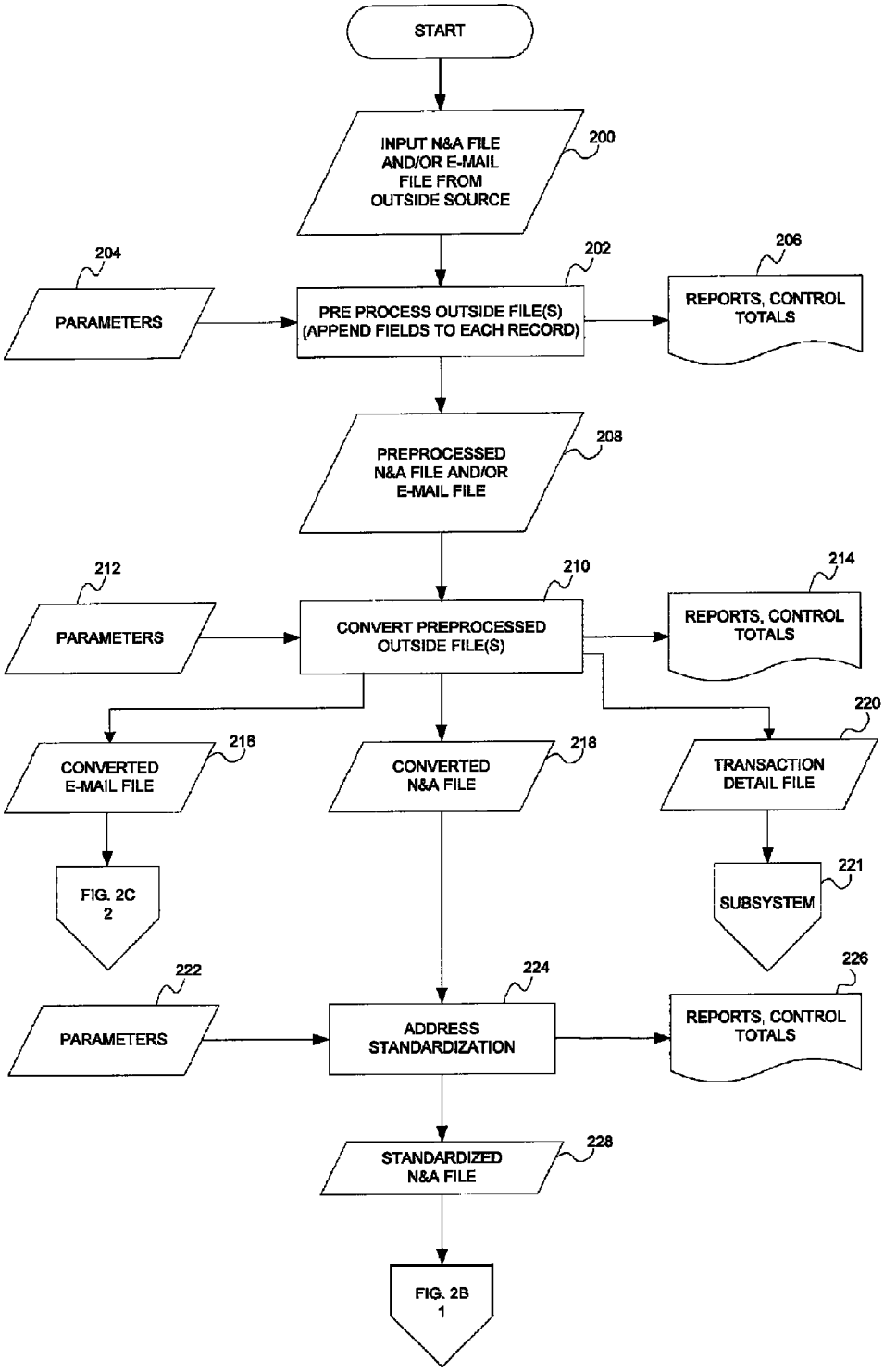
FIGS. 2A-2H show a block/flow diagram depicting the operation of aspects of the address matching and consolidating system according to embodiments of the present invention.

Referring now to FIG. 2A, the updating process may begin with outside list processing, where in block 200 an outside data file, either a name and address file (which may or may not include an e-mail address), or an e-mail address file (which may include incomplete portions of a name and address), serves as the data input for block 202. In block 202, the outside file(s) are preprocessed by appending new fields to each record in the file.

In one embodiment of the invention, four fields are appended to each record having a total of 31 characters. The first field appended is an 8-position file code, where the first five positions represent the file, and the last three positions is a sequence number representing the update in which the file is entering the Dynamic Data Link Database. The second field is a 10-position sequence number starting with the number '0000000001' which goes up by one for each subsequent record. The third field is an 8-position transaction date (YYYYMMDD), which is the date that the transaction was generated by the file owner, which appears inside the record and may be in some other form. The fourth field is a 5-position "data point" value in the form 'xx.xx' which represents the value of the record according to a complex algorithm. These data points represent the value of the record to the list owner for calculating revenue sharing, and has no bearing on the Dynamic Data Link Address Consolidating System described herein. The processing output created from block 202 is the Preprocessed Name and Address File and/or the Preprocessed E-Mail Address File in block 208.

Block 202 may receive input parameters from block 204. The input parameters define various input and output conditions and vary from run to run. An output print file is used for quality control, and control totals showing the input and output counts, and reject counts if any, for each run in block 202 may be output in block 206.

(2) File Conversions

The Preprocessed Name and Address File and/or E-Mail Address File serves as the input to block 210. In block 210, the Preprocessed Name and Address File is converted into database records by a list conversion program. In one embodiment of the invention, Group 1 Software's List Conversion program MW210 is utilized. MW210 in turn calls a proprietary output subroutine, DDLCVTX2, and creates the database record based on the name and address provided.

Block 210 may receive a set of input parameters from block 212. The set of input parameters place the name and address information and e-mail address in the output areas as indicated in the database file layout. A parameter card activates the exit routine DDLCVTX2 which performs the editing of the output record and causes other data to be created, such as a gender code, a match code, and parsed elements from the name field. If a predetermined criteria is not met, the record will be output to a Converted E-Mail File in block 216. The predetermined criteria may include the completeness of the name and address information, the validity of the name and address information, and whether an e-mail address exists. Control then flows to block 246 in FIG. 2C to be discussed below. If the name and address information meets the predetermined criteria, the record will be output to a Converted Name and Address File in block 218. If the e-mail address exists on the name and address record, it will be kept with the record.

The transaction detail data of the additional attributes of the file will be kept in a separate Transaction Detail File in block 220. The Transaction Detail File is sent on to Subsystem 221 to apply this data to the individual records later so that the individuals can be more completely analyzed by type of personal attributes. Special parameter cards from block 212 define the information to be captured in the Transaction Detail File. An output print file is used for quality control, and control totals showing the input and output counts, and reject counts if any, for each run in block 210 may be output in block 214.

Instead of using all the parameters that are usually needed to convert client files into the DDL Address Matching and Consolidating System format, the user will simply move the following fields to the output area: full name, two address lines, city, state, and ZIP Code. The four fields generated in the preprocessing step, the file code, the sequence number, the transaction date, and the data points are automatically put into the proper locations in the output database record by the output exit routine DDLCVTX2.

The output exit routine DDLCVTX2 also takes the name and address information in the output area and does the following: translate to blanks all characters but alpha characters, numeric values, ampersand, slash, pound sign, dash, and apostrophe (lower case characters are translated to upper case); take out imbedded blanks and left justify the individual name, two address lines, and the city; split the individual name into its elements and move the title, first name, middle initial, last name, and suffix into the appropriate output fields; generate the gender code and put it into the gender code field (gender codes are M (Male), F (Female), or U (Unknown) only and the titles Mrs, Ms, and Miss change a non-female title code to F and the title Mr changes a non-male title code to M unless it is already coded F); if the individual name field is identified as a company, the record will be considered to have no individual name; a single trailing character in the city field will be blanked out; a two-digit state code found in the city field matching the state abbreviation is blanked out; and the two street address lines are interrogated and the more significant address line will be placed into the primary address field, and the remaining address line will be placed into the secondary address line. When all this editing is completed, a match code will be generated (described in more detail below).

The ZIP Code field is edited as follows and the results applied in the four-tier categorization discussed below: U.S. ZIP Codes must be numeric (5 positions) not ending in '00' and may not be '99999'; Canada Postal Codes must be alpha in the first position; and ZIP Codes and Canada Postal Codes must fit into specific table ranges of valid sections of each country. That is, the first three positions of the ZIP Code or Canada Postal Code are verified against the state or province abbreviation.

A three position e-mail count field will be populated in the record with zero '000' or one '001' to denote the absence or presence respectively of an e-mail address in the record. This field will be summarized when consolidation of records takes place later in the system process (see block 276 (FIG. 2F)).

In one embodiment of the invention, the output data is edited and put into four tiers of acceptance or rejection. Tier 1 is for records that have a complete name and address according to the editing rules, and may or may not have an e-mail address. These records are output to block 218 in the Converted Name and Address File.

Tier 2 is for records that have a valid name and ZIP Code, but part of the address is incomplete (such as missing street address, invalid or missing city, invalid state/ZIP Code combination, etc.), but the record has either an e-mail address or a street address. These records will also be output to block 218 in the Converted Name and Address File.

Tier 3 is for records where the name or ZIP Code is missing or invalid and an e-mail address exists. These records are output to block 216 in the Converted E-Mail File.

Tier 4 is for records that do not fall into one of the three aforementioned tiers. These records are completely rejected. A limited number of these records may be printed for interrogation. In addition, options are available to reject records for specific reasons which will override the four-tier categorization. Records that are rejected will be counted by category and printed at the end of the current job in block 214.

(3) Address Standardization

The Converted Name and Address File in block 218 serves as the data input for block 224. In block 224, the converted records in the Converted Name and Address File are processed to standardize and/or correct the address data, such as street address, city, state, ZIP Code, ZIP+4 Code, line of travel, and delivery point bar code according to USPS (United States Postal Service) directory files. In one embodiment of the invention, a Group 1 Software program called CODE1 is used for processing the records in block 224.

Block 224 may receive input parameters from block 222. The input parameters define various input and output conditions and vary from run to run. An output print file is used for quality control, and control totals showing the input and output counts, and reject counts if any, for each run in block 224 may be output in block 226. The output created from block 224 is a Standardized Name and Address File in block 228. Control from block 228 flows to FIG. 2B.

(4) Sort Name and Address Transactions

Figure 2B:
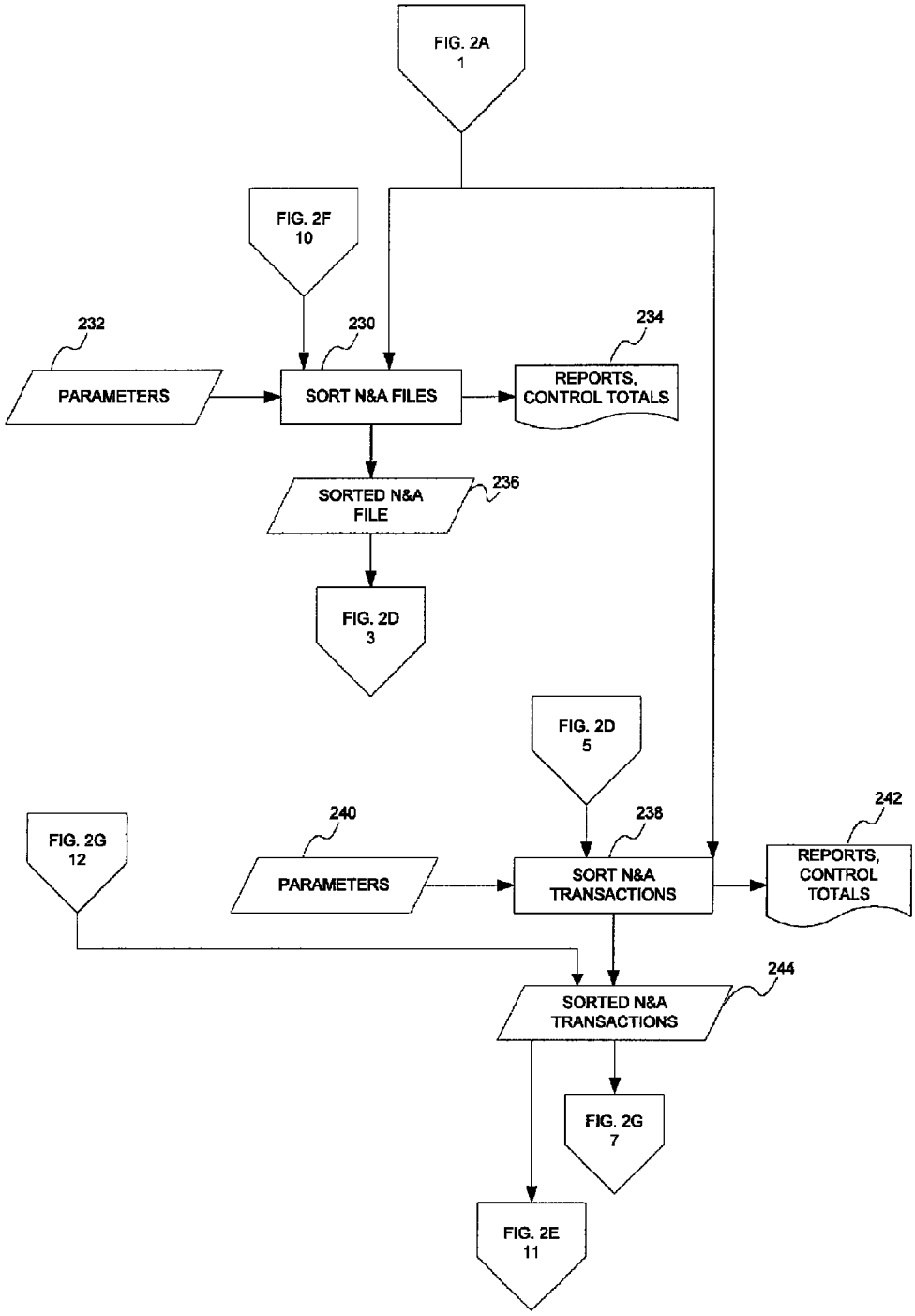

Referring now to FIG. 2B, the Standardized Name and Address File in block 228 (FIG. 2A) serves as data input to block 230 along with the Prior Consolidated Name and Address Database from block 290 (FIG. 2F), to be discussed below. The Standardized Name and Address File in block 228 may also serve as the data input to block 238 as discussed below.

The Standardized Name and Address File from block 228 and the Prior Consolidated Name and Address Database from block 290 from the previous run are sorted together in block 230 by the e-mail address field (in ascending order), dropping all records that do not contain an e-mail address in the e-mail address field. It is not necessary to keep the records without an e-mail address because this file is used only to match against records with an e-mail address but without a name and address. The names and addresses on this output file will be applied later to e-mail records without a name and address. The output created from block 230 is a Sorted Name and Address File in block 236, which will be abandoned after it is matched to the e-mail file.

Block 230 may receive input parameters from block 232. Parameters read into block 230 define the sort sequence and the "omit" condition for dropping all records that do not contain an e-mail address. The parameters are the same each time this step is run. An output print file is used for quality control, and control totals showing the input and output counts, and reject counts if any, for each run in block 230 may be output in block 234. Control from block 236 flows to block 254 (FIG. 2D) discussed below.

(5) Sort E-Mail Transactions with Prior E-Mail Database

Figure 2C:
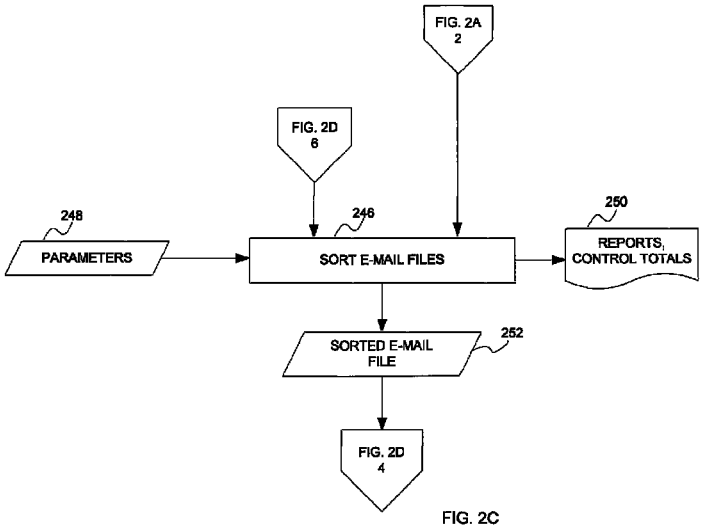
Figure 2D:
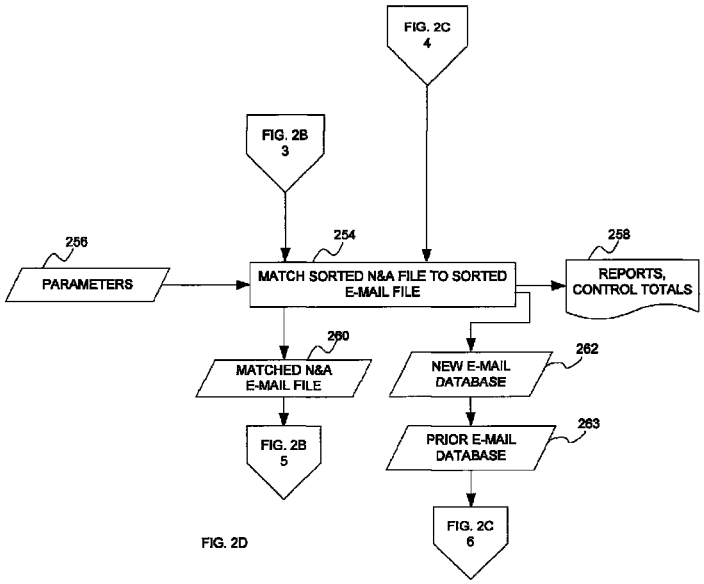

Referring now to FIG. 2C, the Converted E-Mail File in block 216 (FIG. 2A) serves as data input to block 246 along with the Prior E-Mail Database from block 263 (FIG. 2D) generated from the previous run described in block 262 (FIG. 2D). Blocks 262 and 263 are more fully described below in the discussion of FIG. 2D.

The Converted E-Mail File and the Prior E-Mail Database (from the prior run) are sorted together in block 246 by the e-mail address field (in ascending order). The e-mail address on this output file will be matched later to name and address records. Records that match the name and address file will have the name and address applied to the record. The output created from block 246 is a Sorted E-Mail File in block 252.

Block 246 may receive input parameters from block 248. The parameters read into block 246 define the sort sequence and are the same each time this step is run. An output print file is used for quality control, and control totals showing the input and output counts, and reject counts if any, for each run in block 246 may be output in block 250. Control from block 252 flows to block 254 (FIG. 2D).

(6) Match E-Mail File to Name and Address File

Referring now to FIG. 2D, the Sorted Name and Address File in block 236 (FIG. 2B) serves as data input to block 254, along with the Sorted E-Mail File from block 252 (FIG. 2C). In block 254 the Sorted E-Mail File is matched against the Sorted Name and Address File. Records on the Sorted E-mail File that match the Sorted Name and Address File will have the name and address applied to the e-mail record making it a complete name and address record that can be applied to the Name and Address Database. In one embodiment of the invention, Group 1 Software's Generalized Selection Program MW300 is used for the step in block 254. The output created from block 254 is the Matched Name and Address E-Mail File of block 260. Control from block 260 flows to block 238 (FIG. 2B) discussed below.

Records on the Sorted E-Mail File that do not match the Sorted Name and Address File are output as the New E-Mail Database in block 262. With the next run of the program, the New E-Mail Database in block 262 becomes the Prior E-Mail Database in block 263. Control from block 263 flows to block 246 (FIG. 2C) discussed above.

The DDL Address Matching and Consolidating System is the first Merge/Purge type software solution that incorporates e-mail addresses as one of the key match elements. Consequently, records with blank street addresses can be maintained in the database, if e-mail addresses are present along with names and ZIP Codes. When home and/or work telephone numbers are available, the DDL Address Matching and Consolidating System uses them as match keys as well, even if home and work numbers are transposed. When one individual has multiple e-mail addresses, they will all be grouped dynamically comparing any common elements from the multiple sources. Users can then choose an ideal e-mail address based on the last used date, frequency of the usage, or monetary value associated with the e-mail address.

Block 254 may receive input parameters from block 256. Parameters read into block 254 define the sort sequence and are the same each time this step is run. An output print file is used for quality control, and control totals showing the input and output counts, and reject counts if any, for each run in block 254 may be output in block 258.

(7) Sort E-Mail Transactions with Converted N & A Transactions

Referring now again to FIG. 2B, the Standardized Name and Address File from block 228 (FIG. 2A) serves as data input to block 238, along with the Matched Name and Address E-mail File from block 260 (FIG. 2D). In block 238 the records from these two files are sorted together by ZIP Code field and last name field (in ascending order). The output created from block 238 is the Sorted Name and Address Transactions File of block 244. Control from block 244 flows normally to block 264 (FIG. 2E) as discussed below. The Sorted Name and Address Transactions File may also be derived from the process of block 312 (FIG. 2G) also discussed below.

Block 238 may receive input parameters from block 240. Parameters read into block 238 define the sort sequence and are the same each time this step is run. An output print file is used for quality control, and control totals showing the input and output counts, and reject counts if any, for each run in block 238 may be output in block 242. Periodically when necessary, control from block 244 also flows to block 296 (FIG. 2G) for NCOA processing which is discussed below.

(8) Apply New Transactions to the Database

Figure 2E:
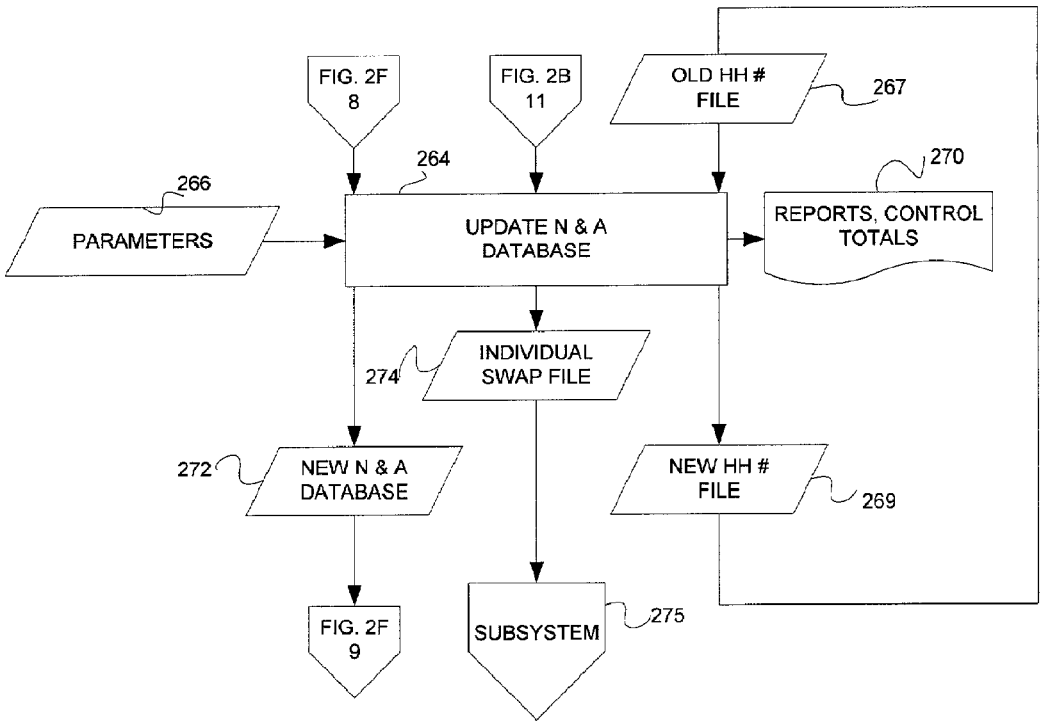

Referring now to FIG. 2E, the Sorted Name and Address Transactions File in block 244 (FIG. 2B) serves as data input to block 264, along with the Prior Consolidated Name and Address Database from block 292 (FIG. 2F) generated from the previous run. In block 264 the Name and Address Database is updated. The Sorted Name and Address Transactions File is matched against the Prior Consolidated Name and Address Database using sophisticated proprietary "merge/purge" algorithms.

"Merge/Purge" algorithms were developed to eliminate duplicate household or individual records in the mailing lists. Regarding database updating, the DDL Address Matching and Consolidating System does not eliminate duplicates. Instead, it properly groups multiple records based on predetermined match algorithms, and then performs a built-in data consolidation routine. "Merge/Purge" algorithms traditionally select records solely based on file sources. The DDL Address Matching and Consolidating System selects best elements from multiple sources, and creates records with best name and address components. The DDL Address Matching and Consolidating System performs Household and Individual merge in one step, whereas traditional "merge/purge" algorithms require two separate steps for similar results but which often result in creating inconsistent Household and Individual ID's. The DDL Address Matching and Consolidating System accepts data inputs separately for the existing database records and a new input data stream. For every new record, the DDL Address Matching and Consolidating System tries to find a match in the existing household and individual groups. Only when a match is not found in the existing database will a new Household and Individual ID be automatically assigned. This is a major improvement over "merge/purge" which is known to have different results from execution to execution, and also saves a great deal of processing time. Additionally, when NCOA data is available, the DDL Address Matching and Consolidating System examines the move status of each individual—not household—in the database, and assigns new Individual ID's whenever necessary.

Records on the Sorted Name and Address Transactions File that match the Prior Consolidated Name and Address Database records are "attached" to that household group. Records are grouped as households when the surname and address are identified as duplicates under the merge/purge algorithm rules. Within each household there may be several individuals. Each individual within the household is grouped together when the first names are identified as duplicates.

The first time the DDL Address Matching and Consolidating System is run, there is no Prior Consolidated Name and Address Database. All transactions are grouped together by household and individual by household. One output created from block 264 is a New Name and Address Database in block 272. The New Name and Address Database has household numbers assigned sequentially as they are discovered starting with the number on the Old Household Number File (block 267) of one record. The first time this number will be '1'. Each individual within the household will have numbers assigned to them linking all the same individuals together within the household. After the run has been completed, a New Household Number File (block 269) will be written with the next starting number to be used.

A record will be considered a household duplicate with another record if the last names and addresses match to the percentages entered in a parameter card. There are certain address matching rules that are not controlled by this parameter card that are built into the system. For example, a P.O. Box address will match a "normal" street address if the first names also match. Optionally, the user may allow household matches if the street addresses are completely different, but the surnames match and either of the telephone numbers or the e-mail addresses match between records. Records will automatically match if their respective match codes are equal.

The records will further be considered not only household matches, but individual matches, if the first names match between records. First names will match if they match according to the first name rule, if they match according to a nick name table (e.g., Jim and James), or if the first three positions of the first name match. Records will not be considered a match by first name if one is male and the other is female. A record will be considered the same individual if one record has a first name and the other has a first initial only and the first initials match (e.g., Mike=M). Further, a record without a suffix will match a record with a suffix that is 'SR' if the first names/initials match. Other suffixes will only match their equal level suffix (e.g., JR=II=2ND, III=3RD, etc.).

If an individual is matched with another individual in one run, and the situation changes in another run, the results of the first run will not change, but may change the outcome in the second run. This will be different for first name/initial matches and suffix matches.

For first name/initial matches, the first initial that is matched in the first run will stay forever with that name. That is, for example, when Mike matches 'M', the records with the initial 'M' will only match records with Mike or Michael and not subsequent records with first names starting with 'M', such as Mark, in that household.

If one record has an incomplete address (incomplete address code='*') and the matching record does not, the complete address will replace the incomplete address in the incomplete address record, and the incomplete address code will be tuned off (i.e., made blank ' '). This is an option controlled by a parameter card from block 266.

If a parameter indicates to the program that the NCOA/Nixie process, discussed in greater detail below, was performed prior to this update, some records will have their Household Number/Individual Number changed and moved to another section of the file because of their geography. During the NCOA process, when changes are applied to the database, the changed database records are put into the transaction job stream and taken out of the database. When this occurs, that is, when a transaction record with an already existing Household Number and Individual Number is put onto the database, it has its old Household Number and Individual Number. A new Household Number and Individual Number is generated, however, and the old numbers are eliminated. When this occurs, a record will be written to an Individual Swap File in block 274 which will contain the old Household Number and Individual Number and the new Household Number and Individual Number.

The Individual Swap File is used in Subsystem 275 to change all records and tables from the old to the new numbers. Subsystem 275 matches all the files that have the old Household Number and Individual Number and replaces each matching record with the new Household Number and Individual Number. Then, if the changed file needs to be in Household Number/Individual Number sequence, it will be sorted into that sequence.

Figure 2F:
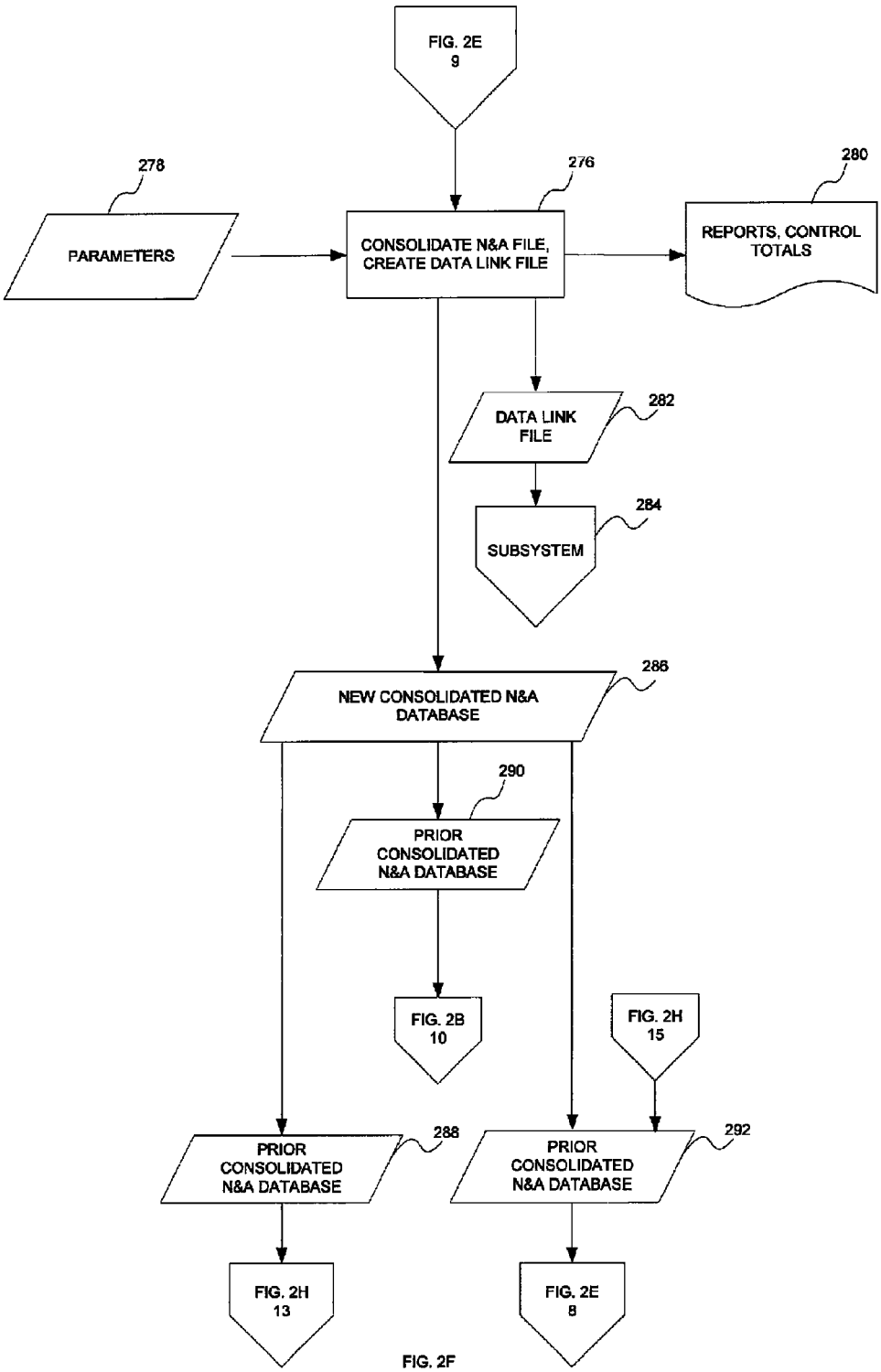

Block 264 may receive input parameters from block 266. Parameters read into block 264 define various input and output conditions and are the same from run to run. An output print file is used for quality control, and control totals showing the input and output counts, and reject counts if any, for each run in block 264 may be output in block 270. The New Name and Address Database in block 272 becomes the input to block 276 (FIG. 2F).

The following table is an example of a group of names and addresses and their corresponding numbers attached to them in the Name and Address Database:

| First | Surname | Address | HH # | Ind. # | HH Seq # | #/HH | Ind. Seq # | #/Ind. | E-mail Address |
|---|---|---|---|---|---|---|---|---|---|
| John | Smith | 123 Main St | 00001 | 00001 | 001 | 005 | 001 | 003 | jsmith@aol.com |
| John | Smith | 123 Main St | 00001 | 00001 | 002 | 005 | 002 | 003 | jsmith@ibm.net |
| John | Smith | 123 Main St | 00001 | 00001 | 003 | 005 | 003 | 003 | |
| Sam | Smith | 123 Main St | 00001 | 00002 | 004 | 005 | 001 | 002 | smity@aol.com |
| Sam | Smith | 123 Main St | 00001 | 00002 | 005 | 005 | 002 | 002 | sam@aol.com |
| Steve | Jones | 456 South St | 00002 | 00001 | 001 | 003 | 001 | 001 | |
| Marcy | Jones | 456 South St | 00002 | 00002 | 002 | 003 | 001 | 002 | |
| Marcy | Jones | 456 South St | 00002 | 00002 | 003 | 003 | 002 | 002 | marcy@ibm.net |

There are six different numbers attached to each record. The HH# is the Household Number that will never change once assigned. When the first file is created, this number will be sequential, but thenceforth, as new households are added to the file, they will be inserted as they are found. The number assigned to these new households will start with the number on the Household Number file. This number will be one greater than the last number assigned from the last run.

The Ind.# is the Individual Number. As individuals are identified within a household, numbers will be assigned to them also. The number assigned to each individual will remain constant also. They are sequentially assigned as discovered starting with the number '1'. Additional individuals within a household found will be assigned the next sequential number.

The HH Seq# is the Household Sequence Number. This is a number sequentially assigned within each household starting with the number 1' and going up by one for each member in the household. This number is regenerated in each run.

The #/HH is the Number Within the Household. This number is the same for each member in the household and represents the total number of records in the household. This number is regenerated in each run.

The Ind. Seq # is the Individual Sequence Number. This is a number sequentially assigned within each individual starting with the number '1' and going up by one for each member in the individual group. This number is regenerated in each run.

The #/Ind is the Number Within the Individual. This number is the same for each member in the individual group and represents the number of records in the individual group. This number is regenerated in each run.

There are two types of matching techniques used in the DDL Address Matching and Consolidating System: Match Codes and Match Algorithms. Match Codes are made up of portions of the characters of the name and address. Longer Match Codes are more accurate. Shorter Match Codes get more matches. The following is an example of a Long Match Code:

ZIP Code
first seven characters of surname
first seven characters of street address
Example
ZIP Code=01001
Surname=Johnson
Street Address=123 N Main St.
Match Code=01001JOHNSON123_N_M Drawbacks to the Long Match Code include transpositions, misspellings, and characters missing. For example, variations may be encountered on the name Johnson: Jonhson, Johnsen, Jonson, etc. Variations may also be encountered on the street address such as 123 No Main St, 123 Main Street, etc.

The following is an example of a Shorter Match Code:

ZIP Code
1st, 3rd, and 4th characters of Surname
1st, 3rd, 5th, 7th, and 9th characters of Street Address
Example
ZIP Code=01001
Surname=Johnson
Street Address=123 N Main St.
Match Code=01001JHN13NMI The Shorter Match Code yields a better result because 'Johnson' is equal to 'Johnsen' in that the surname portion of the Match Code in both cases is 'JHN'. However, even more sophistication can be achieved in picking characters of the name and address. For example, a Match Code for the Surname could be the 1st character followed by the next three consonants after eliminating any double letters in the name. With this Match Code, Johnson, Jahnson, Johnsen, and Johnston are equivalent to each other because they each evaluate to 'JHNS'. As another example, Williams is equal to Wiliams because both evaluate to 'WLMS'. A Match Code for the street address could be the last three house numerics, the first character of the street name, and the next two consonants after eliminating any double letters in the street name. Thus, 123 N Main St, 123 Mainn Street, 123 North Main St, and 123A No Maine Str. all evaluate to '123MN_'. However, this still doesn't account for transpositions, misspellings, or characters missing in critical areas.

For Match Code processing, the name and address is first converted into a Match Code. Next, the Match Codes are sorted by Match Code. Finally, the Match Codes are matched by Match Code.

Match Algorithms match a percentage of critical fields, e.g., surname, house number, and street name. Each field is matched character by character, and then a match percent is calculated as follows:

$$\text{Match Percent} = \frac{\text{Number of Matches}}{(\text{\# of characters in both fields})/2}$$

When a transposition occurs, one match point is given for the two characters. The following examples illustrate the Match algorithm technique:

| | |
|---|---|
| Smith vs. Smyth | 4/(10/2) = 80.0% |
| Smith vs. Smiths | 5/(11/2) = 90.1% |

-continued

| | |
|---|---|
| Smith vs. Smtih | 4/(10/2) = 80.0% |
| Johnson vs. Johnsen | 6/(14/2) = 85.7% |
| Johnson vs. Jonson | 6/(13/2) = 92.3% |
| Johnson vs. Johnston | 7/(15/2) = 93.3% |
| Johnson vs. Jonhsen | 6/(14/2) = 85.7% |

For Match Algorithm processing, first a sort is done by parts of the name and address, i.e., ZIP Code, first character of surname, etc. Next, all names with the same "partial match code" (the first six digits of the entire match code, the zip code, and the first character of the last name), are processed by reading these groups into memory and comparing (using algorithms) each record against every other record. With match algorithm, the Match Code can also be used, having the best of both techniques. The DDL Address Matching and Consolidating System may include both types of matching techniques.

Traditional "merge/purge" algorithms allow match levels to be set at Tight, Medium, and Loose for name and address elements, such as first and last name, street number, street name and apartment number. The DDL Address Matching and Consolidating System provides more control over the match algorithm, adjusting the desired level by setting a percent match on each field. For example, last names can be set to match at a 90% level, first names at a 25% level, street numbers at a 100% level, and street name at a 65% level. In the match process, consecutive letters are counted and transposed characters are taken into account when calculating the match level.

The following is an embodiment of a Match Code subroutine used by the DDL Address Matching and Consolidating System. The Match Code is generated in the file conversion step of block 210 (FIG. 2A), and is part of the record.

The Match Code subroutine is passed three fields of data: the first name, the last name, and the street address. The subroutine will then return three "match coded" fields as follows:

(1) The First Name

The Match Coded first name will be returned to the user in a three character field. This will be the first three characters of the first name unless the first name is a nick name, in which case the substitute for the nick name will replace the nick name. For example, the nick name "Jim" will be replaced with "James", or JIM will become JAM in three characters.

(2) The Last Name

The Match Coded last name will be returned to the user in a five-character field as follows:

First, all imbedded blanks, punctuation, special characters, and consecutive double letters are eliminated. For example, a name like 'MC CALL' will become 'MCAL'. Names with five or less characters will contain all characters up to five. Ending blank characters will remain blank (e.g., 'MCAL' will stay 'MCAL ' with one trailing blanks).

Next, names with more than five characters will have all vowels removed (except the first character), and then the first five remaining characters will be used. If less than five characters remain after the vowels are removed, the remaining blank characters will remain blank. For example 'ARANDELL' becomes 'ARANDEL' which becomes 'ARNDL', and 'BARKER' becomes 'BRKR' with one trailing blank.

(3) The Street Address

The Match Coded street address will be returned to the user in a six-character field. The six-character field will contain two three-character fields as follows:

(A) The Street Name Abbreviation—This is one of the following and will occupy the first three characters of the Street Address Match Code:

For numeric street names, the three-character portion of the Match Code contains up to three numeric characters, right justified, and zero filled. Numeric street names in their alpha form will be converted to their numeric equivalent. For example, First Street becomes '001', 22nd Street becomes '022', and 123rd Street becomes '123'.

For "normal" street names like '57 Main Street' the first, third, and fourth characters of the street name are used. For example 'MAIN' becomes 'MIN'.

For Street addresses beginning with 'Avenue' type words such as 'Avenue A' or 'Highway 10', the three-character portion of the Match Code is a standard abbreviation of the word such as 'AVE' or 'HWY'.

For box type addresses including P.O. Box and Rural Route/Box addresses, the word 'BOX' is used. For rural route addresses without box numbers, the word 'RUR' is used.

(B) The Street Number—This is one of the following and occupies the last three characters of the Street Address Match Code:

For numeric and "normal" street addresses the last three characters of the Match Code contain the three low-order characters of the house number. For example, '9 West 57th Street' generates '009' for the house number and '1234 Main Street' yields '234' for the numeric portion of the address Match Code.

For street addresses beginning with AVENUE type words, the avenue number or name appears right justified and zero filled. For example, 'Avenue A' becomes '00A' and 'Ave 23' yields '023'.

For box type street addresses including PO Box and Rural Route/Box addresses, the box number is used and is right justified and zero filled. For rural route addresses without box numbers, the rural route number is used and is right justified and zero filled.

(9) Consolidate The Dynamic Data Link Database

Referring now to FIG. 2F, the New Name and Address Database in block 272 (FIG. 2E) serves as the data input to block 276. After each update of the Name and Address Database file, it is consolidated in block 276 to contain one record per e-mail address per individual in the household, and is output as a New Consolidated Name and Address Database in block 286. At the same time in block 276, a Transaction Level Data Link File will be produced and output in block 282.

One Transaction Level Data Link Record will be written for each new record on the New Consolidated Name and Address Database. Records that have already had a Transaction Level Data Link Record written will not have a File Code and an Original Sequence Number. Those fields will be made blank in the New Consolidated Name and Address Database record when the Transaction Level Data Link Record is written. When records on the New Consolidated Name and Address Database are eliminated, the Number of Same E-mail Addresses will be summed and consolidated into the surviving records. The next time this program is run, no Transaction Level Data Link records will be written for old records on the Name and Address Database (the records with the blank File Codes and blank Original Sequence Numbers).

The Transaction Level Data Link File in block 282 is sent to Subsystem 284 where the file is utilized to connect any data to its original source. This is accomplished by using sorts and file matches. The file matches are performed either sequentially or by table look-up.

In one embodiment of the invention, records are eliminated and consolidated in the following fashion. First, for each household, the "best" street address is put into all surviving records on the New Consolidated Name and Address Database. The best record will be decided as follows: A two-digit code is assigned to each record and the record with the lowest code is taken. The first position of the code is a zero ('0') or a one ('1') based on the presence or absence of a ZIP+4 Code respectively. The second position of the code is based on the type of address found as follows:

'0' = Tier 1 Address with C/O Address
'1' = Tier 1 "Normal" Address
'2' = Tier 1 PO Box Address
'3' = Tier 1 Rural Address
'4' = Tier 1 Others
'5' = Tier 2 Address with C/O Address
'6' = Tier 2 "Normal" Address
'7' = Tier 2 PO Box Address
'8' = Tier 2 Rural Address
'9' = Tier 2 Others If two records have the same code generated, the longer of the two addresses will be used to determine the best record. All fields associated with the best address will be kept with the surviving records. This includes: C/O Address, Street Address, State, ZIP Code, ZIP+4 Code, Delivery Point Bar Code, Carrier Route Code, Address Standardization Return Flag, NCOA/Nixie Codes, and address portion of the Match Code.

On an individual level, the record with the "best" first name will be kept. Then, all things being equal, the record with a suffix (i.e., SR) will be kept over the record without a suffix. The best first name is the one with the lowest code defined as follows:

'0' = Full Name With Gender
'1' = Full Name Without Gender
'2' = First Initial With Gender
'3' = First Initial Without Gender
'4' = No First Name/Initial With Gender
'5' = No First Name/Initial Without Gender If two records have the same code generated, the longer of the two first names will be used to determine the best record. If the two records are equal in length, the best name will be determined by the length of the full name. All fields associated with the name determined to be best will be kept with the surviving records. This includes first name, middle initial, maturity title, title, gender, full name, and first and last name portion of the Match Code. For each individual, the latest transaction date will be kept in the New Consolidated Name and Address Record(s) that survived.

Surviving New Consolidated Name and Address Records will not have more than one record per e-mail address per individual. If an individual exists and there are no e-mail addresses for that individual, one name and address record will survive with no e-mail address. A Name and Address record with no e-mail address will be kept on the New Consolidated Name and Address Database only if there are no e-mail addresses for that individual. The Number Of Same E-Mail Addresses will be summarized in that field in the New Consolidated Name and Address Record.

Block 276 may receive input parameters from block 278. The parameters read into block 276 define various input and output conditions and are the same from run to run. An output print file is used for quality control, and control totals showing the input and output counts, and reject counts if any, for each run in block 276 may be output in block 280.

The New Consolidated Name and Address Database in block 286 in subsequent runs becomes the Prior Consolidated Name and Address Database in blocks 288 (or 290 and 292). The Prior Consolidated Name and Address Database in block 288 becomes the input to block 318 (FIG. 2H) discussed below. The Prior Consolidated Name and Address Database in block 290 becomes the input to block 230 (FIG. 2B) discussed above. The Prior Consolidated Name and Address Database in block 292 becomes the input to block 264 (FIG. 2E) discussed above along with the Prior Sorted Name and Address Database from block 340 (FIG. 2H) discussed below.

(10) Periodic NCOA (National Change Of Address System) Processing

Figure 2G:
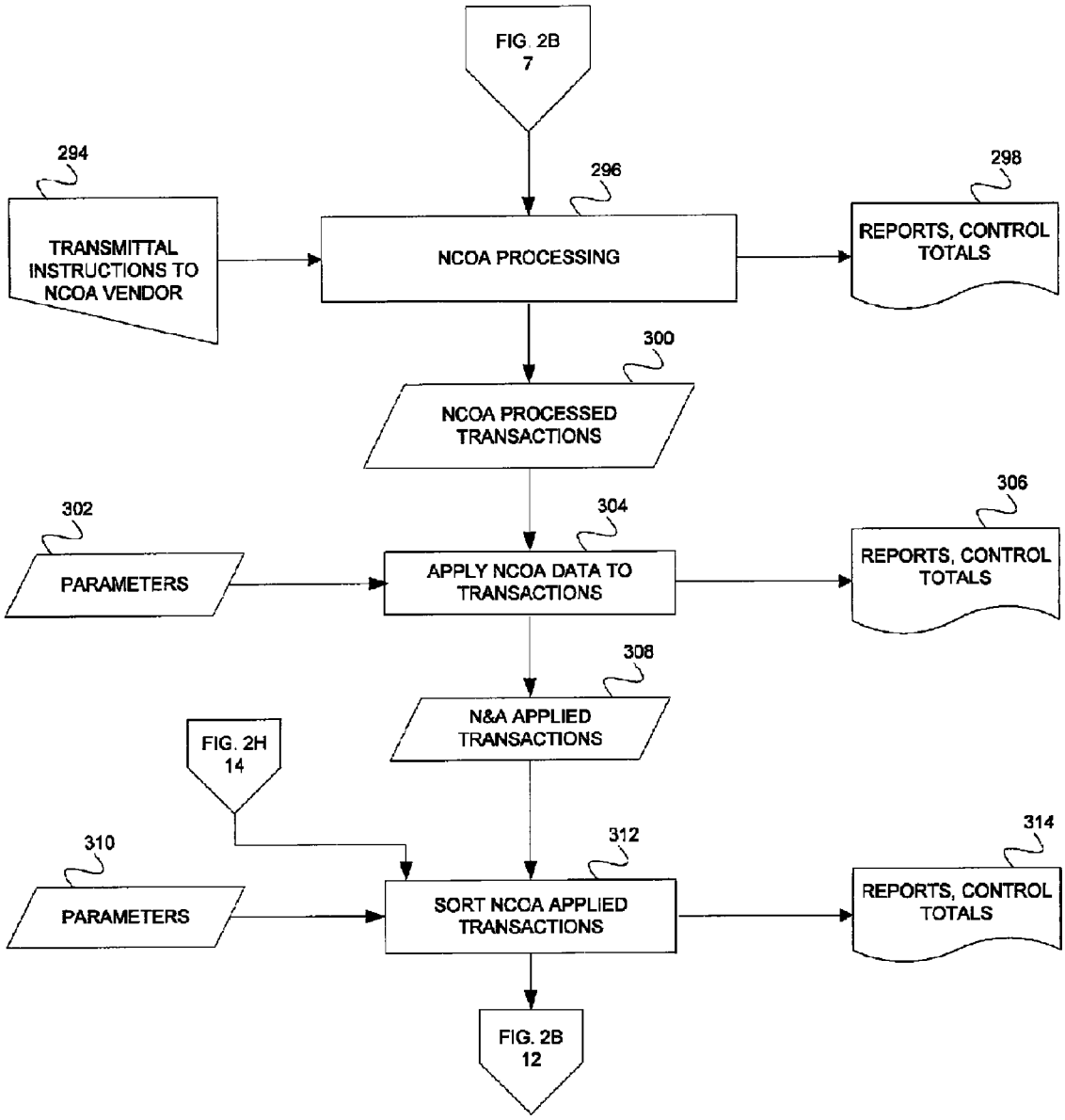
Figure 2H:
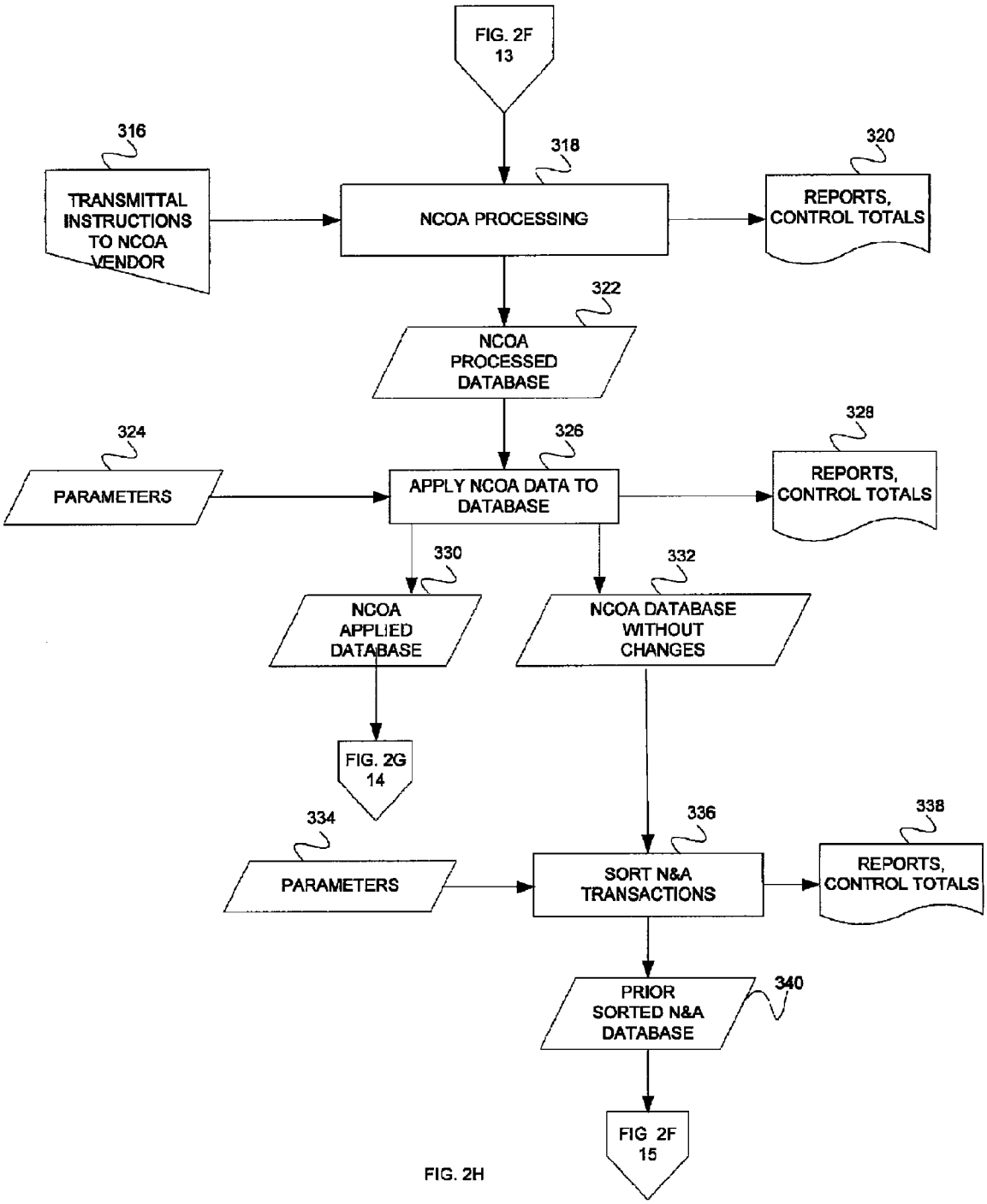

Referring now to FIG. 2H, the Prior Consolidated Name and Address Database from block 288 (FIG. 2F) serves as data input to block 318. When necessary, the Prior Consolidated Name and Address Database is sent out to a USPS licensed NCOA vendor in block 318 to be processed. The records will be returned in their original format as NCOA Processed Database in block 322 with the NCOA/Nixie information appended to each record when appropriate. Records that almost match the NCOA database are identified as Nixie matches. The new address is not returned for Nixie matches, since an exact match was not identified, but the move type and move date are returned along with one or more Nixie footnote codes. The Nixie footnote codes are used to define the difference between the input record and the NCOA record. The Nixie footnote codes can be used to determine whether the record should be eliminated for mailing.

Block 318 receives transmittal instructions for the NCOA vendor from block 316. The reports returned from the NCOA vendor in block 320 are used for quality control purposes. These reports will show the number and type of address changes. The control totals will be used to validate that all processing has been completed and done correctly.

In block 326 the NCOA Processed Database is applied to the Name and Address Database, altering the records in the Name and Address Database that have had address changes. Some records will be marked because they have no forwarding address, box closed, or moved to a foreign address. These records are not mailable. Records that have been altered are output in block 330 as the NCOA Applied Database File and the remaining unaltered records are output in block 332 as the NCOA Database Without Changes File. The NCOA Applied Database File with the records that have been altered becomes part of the new transactions input for the update of the Name and Address Database in block 312 (FIG. 2G).

Block 326 may receive input parameters from block 324. Parameters read into block 326 define the sort sequence and are the same each time this step is run. An output print file is used for quality control, and control totals showing the input and output counts, and reject counts if any, for each run in block 326 may be output in block 328.

The Database Without Changes File from block 332 serves as data input to block 336. The records from the NCOA Database Without Changes File are sorted together in block 336 by ZIP Code, first character of last name, household number, and individual number (in ascending order). The output created from block 336 is Prior Sorted Name and Address Database in block 340. Control then flows to block 292 (FIG. 2F) where the Prior Sorted Name and Address Database, along with the Prior Consolidated Name and Address Database of block 292 (FIG. 2F) serve as the input to block 264 (FIG. 2E).

Block 336 may receive input parameters from block 334. Parameters read into block 336 define the sort sequence and are the same each time this step is run. An output print file is used for quality control, and control totals showing the input and output counts, and reject counts if any, for each run in block 336 may be output in block 338.

Referring now to FIG. 2G, the Sorted Name and Address Transactions File from block 244 (FIG. 2B) serves as data input to block 296. When necessary, the Sorted Name and Address Transactions File is sent out to a USPS licensed NCOA vendor to be processed as discussed above. The records are returned in their original format with the NCOA/Nixie information appended to each record when appropriate.

Block 296 receives transmittal instructions for the NCOA vendor from block 294. The reports returned from the NCOA vendor in block 298 are used for quality control purposes. These reports will show the number and type of address changes. The control totals will be used to validate that all processing has been completed and done correctly.

The output created from block 296 is the NCOA Processed Transactions File in block 300. The NCOA Processed Transactions File is applied in block 304 to the records that have had address changes. Some records will be marked because they have no forwarding address, box closed, or moved to a foreign address. These records are not mailable. All records, changed or unchanged, are put on the same output file, which is the Name and Address Applied Transactions File in block 308.

Block 304 may receive input parameters from block 302. Parameters read into block 304 define various input and output conditions and are the same from run to run. An output print file is used for quality control, and control totals showing the input and output counts, and reject counts if any, for each run in block 304 may be output in block 306.

The Name and Address Applied Transactions File from block 308 serves as the data input to block 312, along with the NCOA Applied Database from block 330 (FIG. 2H). The Name and Address Applied Transactions File records and the NCOA Applied Database records are sorted together by ZIP Code field and last name field (in ascending order).

Block 312 may receive input parameters from block 310. Parameters read into block 312 define the sort sequence and are the same each time this step is run. An output print file is used for quality control, and control totals showing the input and output counts, and reject counts if any, for each run in block 312 may be output in block 314. Control then flows to block 244 (FIG. 2B).

Having described the present invention, it will be understood by those skilled in the art that many changes in construction and circuitry and widely differing embodiments and applications of the invention will suggest themselves without departing from the scope of the present invention.

What is claimed is:

1. A method for matching and consolidating addresses in a name and address database, the method comprising:

(a) sorting records from the name and address database and records from a standardized name and address file by a first e-mail address field to create a sorted name and address file;

(b) sorting records from a prior e-mail database and records from a converted e-mail file by a second e-mail address field to create a sorted e-mail file;

(c) matching said records from said sorted e-mail file against said records from said sorted name and address file, wherein each of said records of said sorted e-mail file that match a one of said records from said sorted name and address file has a name and address from each said matched sorted name and address record added to each of said matched record of said sorted e-mail file to create a matched name and address e-mail file;

(d) sorting records from said matched name and address e-mail file and records from said standardized name and address file by a first ZIP Code field and a first last name field to create a first sorted name and address transactions file;

(e) updating the name and address database by matching records from said first sorted name and address transactions file against records from a prior consolidated name and address database to create a new name and address database; and (f) consolidating said new name and address database by eliminating records from said new name and address database such that only one record per an e-mail address per an individual in a household remains to create a new consolidated name and address database.

2. A method for matching and consolidating addresses in a name and address database according to claim 1 further comprising:

preprocessing at least one outside data file by appending at least one new field to each record in said at least one outside data file to create at least one preprocessed data file;

converting said at least one preprocessed data file into database records by applying a list conversion program to said at least one preprocessed data file to create a converted name and address file containing each of said database records that meet a predetermined criteria, and to create said converted e-mail file containing each of said database records that do not meet said predetermined criteria; and processing each of said converted database records contained in said converted name and address file to standardize an address data for each of said converted database records to create said standardized name and address file.

3. A method for matching and consolidating addresses in a name and address database according to claim 2 wherein said at least one new field comprises at least one of a file code field, a sequence number field, a transaction date field, and a value field.

4. A method for matching and consolidating addresses in a name and address database according to claim 1 wherein said sorting step (a) comprises excluding from said sorted name and address file each record from the name and address database and each record from said standardized name and address file that does not contain an e-mail address in said e-mail address field.

5. A method for matching and consolidating addresses in a name and address database according to claim 1 wherein said matching step (c) comprises creating a new e-mail database containing records from said sorted e-mail file that do not match said records from said sorted name and address file, wherein said new e-mail database becomes said prior e-mail database in a subsequent run of the method for matching and consolidating addresses in a name and address database.

6. A method for matching and consolidating addresses in a name and address database according to claim 1 further comprising:

sending said first sorted name and address transactions file out for change of address processing to create a change of address processed transactions file.

7. A method for matching and consolidating addresses in a name and address database according to claim 6 wherein said change of address processing is performed by a Unites States Postal Service licensed National Change Of Address vendor.

8. A method for matching and consolidating addresses in a name and address database according to claim 6 further comprising:

applying said change of address processed transactions file to said first sorted name and address transactions file; and altering each record in said first sorted name and address transactions file that has had an address change to create a name and address applied transactions file containing each of said altered records and containing each unaltered record.

9. A method for matching and consolidating addresses in a name and address database according to claim 8 further comprising:

sorting records from said name and address applied transactions file together with records from a change of address applied database by a second ZIP Code field and a second last name field to create a second sorted name and address transactions file.

10. A method for matching and consolidating addresses in a name and address database according to claim 1 wherein said updating step (e) further comprises:

when a first record with an incomplete address matches a second record with a complete address, replacing said incomplete address of said first record with said complete address from said second record.

11. A method for matching and consolidating addresses in a name and address database according to claim 1 wherein said updating step (e) comprises:

utilizing a match code technique for matching said records from said first sorted name and address transactions file against said records from said prior consolidated name and address database.

12. A method for matching and consolidating addresses in a name and address database according to claim 11 wherein said match code technique comprises:

converting a name and address from each record of said first sorted name and address transactions file into a match code;

converting a name and address from each record of said prior consolidated name and address database into said match code; and matching by said match code of said each record of said first sorted name and address transactions file against said match code of said each record of said prior consolidated name and address database.

13. A method for matching and consolidating addresses in a name and address database according to claim 12 wherein said match code for said each record of said first sorted name and address transactions file is comprised of a portion of characters of said name and address of each said record of said first sorted name and address transactions file, and said match code for said each record of said prior consolidated name and address database is comprised of said portion of characters of said name and address of each said record of said prior consolidated name and address database.

14. A method for matching and consolidating addresses in a name and address database according to claim 13 wherein said portion of characters are drawn from a ZIP Code, a surname, and a street address.

15. A method for matching and consolidating addresses in a name and address database according to claim 13 wherein said portion of characters are drawn from a first name, a last name, and a street address.

16. A method for matching and consolidating addresses in a name and address database according to claim 1 wherein said updating step (e) comprises:

utilizing a match algorithm technique for matching said records from said first sorted name and address transactions file against said records from said prior consolidated name and address database.

17. A method for matching and consolidating addresses in a name and address database according to claim 16 wherein said match algorithm technique comprises:

sorting said records from said first sorted name and address transactions file and said records from said prior consolidated name and address database by a partial match code, wherein said partial match code comprises a portion of characters of a name and address of each said record;

grouping said sorted records by names having a same partial match code; and comparing each said grouped sorted record against every other said grouped sorted record.

18. A method for matching and consolidating addresses in a name and address database according to claim 16 wherein said match algorithm matches a percentage of at least one critical field, wherein each said at least one critical field is matched character by character, and a match percent is calculated as $$\text{match percent} = \frac{\text{Number of Matches}}{(\text{\# of characters in both at least one critical fields})/2}.$$

19. A method for matching and consolidating addresses in a name and address database according to claim 1 wherein said consolidating step (f) comprises:

writing a transaction level data link record for each record in said new consolidated name and address database to create a transaction level data link file.

20. A method for matching and consolidating addresses in a name and address database according to claim 1 wherein said consolidating step (f) comprises:

assigning a two-digit code to each record within a household in said new consolidated name and address database;

determining which of said each record within a household has a lowest code value; and placing the street address from said record within a household having the lowest code in all records within said household.

21. A method for matching and consolidating addresses in a name and address database according to claim 19 wherein a first position of said two-digit code is based on the presence of a ZIP+4 Code in each of said records within said household in said new consolidated name and address database, and a second position of said two-digit code is based on a type of address found in each of said records within said household in said new consolidated name and address database.

22. A computer system for consolidating addresses in a name and address database, said computer system comprising:

dynamic data link software;

a storage device for storing said dynamic data link software and the name and address database;

a memory for loading said dynamic data link software from said storage device; and a processing element, wherein said dynamic data link software loaded into said memory is executable by said processing element, wherein upon execution by said processing element, said dynamic data link software accesses and sorts records from the name and address database and records from a standardized name and address file by a first e-mail address field to create a sorted name and address file, and said dynamic data link software sorts records from a prior e-mail mail database and records from a converted e-mail file by a second e-mail address field to create a sorted e-mail file, and said dynamic data link software matches said records from said sorted e-mail file against said records from said sorted name and address file, wherein each of said records of said sorted e-mail file that match a one of said records from said sorted name and address file has a name and address from each said matched sorted name and address record added to each of said matched record of said sorted e-mail file to create a matched name and address e-mail file, and said dynamic data link software sorts records from said matched name and address e-mail file and records from said standardized name and address file by a first ZIP Code field and a first last name field to create a first sorted name and address transactions file, and said dynamic data link software updates the name and address database by matching records from said first sorted name and address transactions file against records from a prior consolidated name and address database to create a new name and address database, and said dynamic data link software consolidates said new name and address database by eliminating records from said new name and address database such that only one record per an e-mail address per an individual in a household remains to create a new consolidated name and address database.

23. A computer system for consolidating addresses in a name and address database according to claim 22 wherein said dynamic data link software preprocesses at least one outside data file by appending at least one new field to each record in said at least one outside data file to create at least one preprocessed data file, and said dynamic data link software converts said at least one preprocessed data file into database records by applying a list conversion program to said at least one preprocessed data file to create a converted name and address file containing each of said database records that meet a predetermined criteria, and said dynamic data link software creates said converted e-mail file containing each of said database records that do not meet said predetermined criteria, and said dynamic data link software processes each of said converted database records contained in said converted name and address file to standardize an address data for each of said converted database records to create said standardized name and address file.

24. A computer system for consolidating addresses in a name and address database according to claim 22 wherein said dynamic data link software utilizes a match code technique for matching said records from said first sorted name and address transactions file against said records from said prior consolidated name and address database.

25. A computer system for consolidating addresses in a name and address database according to claim 22 wherein said dynamic data link software utilizes a match algorithm technique for matching said records from said first sorted name and address transactions file against said records from said prior consolidated name and address database.

26. An apparatus for consolidating addresses in a name and address database, said apparatus comprising:

storage means for storing a dynamic data link software and the name and address database;

memory means for loading said dynamic data link software from said storage means; and processing means, wherein said dynamic data link software loaded into said memory is executable by said processing means, wherein upon execution by said processing means, said dynamic data link software accesses and sorts records from the name and address database and records from a standardized name and address file by a first e-mail address field to create a sorted name and address file, and said dynamic data link software sorts records from a prior e-mail database and records from a converted e-mail file by a second e-mail address field to create a sorted e-mail file; and said dynamic data link software matches said records from said sorted e-mail file against said records from said sorted name and address file, wherein each of said records of said sorted e-mail file that match a one of said records from said sorted name and address file has a name and address from each said matched sorted name and address record added to each of said matched record of said sorted e-mail file to create a matched name and address e-mail file; and said dynamic data link software sorts records from said matched name and address e-mail file and records from said standardized name and address file by a first ZIP Code field and a first last name field to create a first sorted name and address transactions file; and said dynamic data link software updates the name and address database by matching records from said first sorted name and address transactions file against records from a prior consolidated name and address database to create a new name and address database; and said dynamic data link software consolidates said new name and address database by eliminating records from said new name and address database such that only one record per an e-mail address per an individual in a household remains to create a new consolidated name and address database.

27. An apparatus for consolidating addresses in a name and address database according to claim 26 wherein said dynamic data link software preprocesses at least one outside data file by appending at least one new field to each record in said at least one outside data file to create at least one preprocessed data file, and said dynamic data link software converts said at least one preprocessed data file into database records by applying a list conversion program to said at least one preprocessed data file to create a converted name and address file containing each of said database records that meet a predetermined criteria, and said dynamic data link software creates said converted e-mail file containing each of said database records that do not meet said predetermined criteria, and said dynamic data link software processes each of said converted database records contained in said converted name and address file to standardize an address data for each of said converted database records to create said standardized name and address file.

28. An apparatus for consolidating addresses in a name and address database according to claim 26 wherein said dynamic data link software utilizes a match code technique for matching said records from said first sorted name and address transactions file against said records from said prior consolidated name and address database.

29. An apparatus for consolidating addresses in a name and address database according to claim 26 wherein said dynamic data link software utilizes a match algorithm technique for matching said records from said first sorted name and address transactions file against said records from said prior consolidated name and address database.

30. A method for updating a name and address database, the method comprising:

(a) utilizing an e-mail address for at least one key match element in matching a plurality of records in the name and address database with a plurality of records from at least one new input data stream;

(b) grouping a plurality of e-mail addresses for a same individual matched from said plurality of records in the name and address database and said plurality of records from at least one new input data stream forming a plurality of subgroup of records;

(c) comparing dynamically a plurality of common elements from a first subgroup of said plurality of subgroup of records;

(d) applying a predetermined criteria to said plurality of common elements to select a best e-mail address; and (e) saving said selected best e-mail address with a record for said same individual in the name and address database.

31. A method for updating a name and address database according to claim 30 wherein said predetermined criteria to select a best e-mail address comprises at least one of a last used date, a frequency of usage, and a monetary value associated with the e-mail address.

32. A method for updating a name and address database according to claim 30 further comprising:

repeating steps (c), (d), and (e) for a next subgroup of records from said plurality of subgroup of records until all of said plurality of subgroup of records are processed.

33. A method for updating a name and address database according to claim 30 further comprising:

saving each of said plurality of records from the name and address database with a blank street address that have an e-mail address, a name, and a ZIP Code in the name and address database; and saving each of said plurality of records from said at least one new input data stream with a blank street address that have an e-mail address, a name, and a ZIP Code in the name and address database.

34. A method for updating a name and address database, the method comprising:

(a) applying a predetermined match algorithm to a plurality of records from at least one new input data stream and to a plurality of records from the name and address database;

(b) grouping said plurality of records from said at least one new input data stream and said plurality of records from the name and address database based on the results of said predetermined match algorithm forming a plurality of subgroup of records;

(c) from a first subgroup of records from said plurality of subgroup of records, selecting a plurality of best elements; and (d) when said first subgroup of records contains at least one record from the name and address database, updating said at least one record from the name and address database with said plurality of best elements; and (e) when said first subgroup of records does not contain said at least one record from the name and address database, creating a new record having said plurality of best elements.

35. A method for updating a name and address database according to claim 34 further comprising:

setting a percent match on at least one field from said plurality of records from the name and address database and from said plurality of records from said new input data stream prior to said applying step (a).

36. A method for updating a name and address database according to claim 34 wherein said creating step (e) further comprises:

creating a new household ID and a new Individual ID for said new record having said plurality of best elements.

37. A method for updating a name and address database according to claim 34 further comprising:

repeating steps (c), (d), and (e) for a next subgroup of records from said plurality of subgroup of records until all of said plurality of subgroup of records are processed.

38. Computer-readable media tangibly embodying a program of instructions executable by a computer to perform a method for matching and consolidating addresses in a name and address database in a computer system, said method comprising:

(a) preprocessing at least one outside name and address file to append at least one new field to each record in said at least one outside name and address file;

(b) preprocessing at least one outside e-mail file to append at least one new field to each record in said at least one outside e-mail file;

(c) converting said preprocessed at least one outside name and address file into a plurality of database records through a list conversion program;

(d) converting said preprocessed at least one outside e-mail file into a plurality of database records through said list conversion program;

(e) standardizing address data for each of said plurality of database records from said at least one outside name and address file;

(f) sorting said plurality of database records each having said standardized address data from said at least one outside name and address file with a plurality of records from a prior consolidated name and address database by a first e-mail address field yielding a sorted name and address file;

(g) sorting said converted plurality of database records from said at least one outside e-mail file with a plurality of records from a prior e-mail address database by a second e-mail address field yielding a sorted e-mail file;

(h) matching said sorted name and address file with said sorted e-mail file yielding a matched name and address e-mail file;

(i) sorting said plurality of database records each having said standardized address data from said at least one outside name and address file with said matched name and address e-mail file yielding a first sorted name and address transactions file;

(j) matching said prior consolidated name and address database with said first sorted name and address transactions file using a merge/purge algorithm yielding a new name and address database; and (k) eliminating a plurality of records from said new name and address database such that only one record per e-mail address per individual in a household remains yielding a new consolidated name and address database.

39. Computer-readable media tangibly embodying a program of instructions executable by a computer to perform a method according to claim 38 wherein said at least one new field comprises at least one of a file code field, a sequence number field, a transaction date field, and a value field.

40. Computer-readable media tangibly embodying a program of instructions executable by a computer to perform a method according to claim 38 wherein said sorting step (f) comprises excluding from said sorted name and address file each record from the name and address database and each record having said standardized address data from said at least one outside name and address file that does not contain an e-mail address in said first e-mail address field.

41. Computer-readable media tangibly embodying a program of instructions executable by a computer to perform a method according to claim 38 wherein said matching step (h) comprises creating a new e-mail database containing a plurality of records from said sorted e-mail file that do not match any records from said sorted name and address file, wherein said new e-mail database becomes said prior e-mail database in a subsequent run of the method for matching and consolidating addresses in the name and address database.

42. Computer-readable media tangibly embodying a program of instructions executable by a computer to perform a method according to claim 38 further comprising:

sending said first sorted name and address transactions file out for change of address processing to create a change of address processed transactions file.

43. Computer-readable media tangibly embodying a program of instructions executable by a computer to perform a method according to claim 42 wherein said change of address processing is performed by a Unites States Postal Service licensed National Change Of Address vendor.

44. Computer-readable media tangibly embodying a program of instructions executable by a computer to perform a method according to claim 42 further comprising:

applying said change of address processed transactions file to said first sorted name and address transactions file; and altering each record in said first sorted name and address transactions file that has had an address change to create a name and address applied transactions file containing each of said altered records and containing each unaltered record.

45. Computer-readable media tangibly embodying a program of instructions executable by a computer to perform a method according to claim 44 further comprising:

sorting records from said name and address applied transactions file together with records from a change of address applied database by a second ZIP Code field and a second last name field to create a second sorted name and address transactions file.

46. Computer-readable media tangibly embodying a program of instructions executable by a computer to perform a method according to claim 38 wherein said matching step (j) further comprises:

when a first record with an incomplete address matches a second record with a complete address, replacing said incomplete address of said first record with said complete address from said second record.

47. Computer-readable media tangibly embodying a program of instructions executable by a computer to perform a method according to claim 38 wherein said matching step (j) comprises:

utilizing a match code technique for matching said records from said first sorted name and address transactions file against said records from said prior consolidated name and address database.

48. Computer-readable media tangibly embodying a program of instructions executable by a computer to perform a method according to claim 47 wherein said match code technique comprises:

converting a name and address from each record of said first sorted name and address transactions file into a match code;

converting a name and address from each record of said prior consolidated name and address database into said match code; and matching by said match code of said each record of said first sorted name and address transactions file against said match code of said each record of said prior consolidated name and address database.

49. Computer-readable media tangibly embodying a program of instructions executable by a computer to perform a method according to claim 48 wherein said match code for each said record of said first sorted name and address transactions file is comprised of a portion of characters of said name and address of each said record of said first sorted name and address transactions file, and said match code for each said record of said prior consolidated name and address database is comprised of said portion of characters of said name and address of each said record of said prior consolidated name and address database.

50. Computer-readable media tangibly embodying a program of instructions executable by a computer to perform a method according to claim 49 wherein said portion of characters are drawn from a ZIP Code, a surname, and a street address.

51. Computer-readable media tangibly embodying a program of instructions executable by a computer to perform a method according to claim 49 wherein said portion of characters are drawn from a first name, a last name, and a street address.

52. Computer-readable media tangibly embodying a program of instructions executable by a computer to perform a method according to claim 38 wherein said matching step (j) comprises:

utilizing a match algorithm technique for matching said records from said first sorted name and address transactions file against said records from said prior consolidated name and address database.

53. Computer-readable media tangibly embodying a program of instructions executable by a computer to perform a method according to claim 52 wherein said match algorithm technique comprises:

sorting said records from said first sorted name and address transactions file and said records from said prior consolidated name and address database by a partial match code, wherein said partial match code comprises a portion of characters of a name and address of each said record;

grouping said sorted records by names having a same partial match code; and comparing each said grouped sorted record against every other said grouped sorted record.

54. Computer-readable media tangibly embodying a program of instructions executable by a computer to perform a method according to claim 52 wherein said match algorithm matches a percentage of at least one critical field, wherein each said at least one critical field is matched character by character, and a match percent is calculated as $$\text{match percent} = \frac{\text{Number of Matches}}{(\text{\# of characters in both at least one critical fields})/2}.$$

55. Computer-readable media tangibly embodying a program of instructions executable by a computer to perform a method according to claim 38 wherein said eliminating step (k) comprises:

writing a transaction level data link record for each record in said new consolidated name and address database to create a transaction level data link file.

56. Computer-readable media tangibly embodying a program of instructions executable by a computer to perform a method according to claim 38 wherein said eliminating step (k) comprises:

assigning a two-digit code to each record within a household in said new consolidated name and address database;

determining which of said each record within a household has a lowest code value; and placing the street address from said record within a household having the lowest code in all records within said household.

57. Computer-readable media tangibly embodying a program of instructions executable by a computer to perform a method according to claim 56 wherein a first position of said two-digit code is based on the presence of a ZIP+4 Code in each of said records within said household in said new consolidated name and address database, and a second position of said two-digit code is based on a type of address found in each of said records within said household in said new consolidated name and address database.

*58. A method for matching and consolidating addresses in a name and address database, the method comprising:*

*matching one or more records from a sorted e-mail file against one or more records from a sorted name and address file, wherein each record in the sorted e-mail file includes an e-mail address, and wherein each record in the sorted name and address file has at least a valid name or a valid address portion;*

*updating the sorted e-mail file by adding to each of said matched records of the sorted e-mail file a name and address from the corresponding matched record from the sorted name and address file;*

*using the updated e-mail file to match records against a prior version of the name and address database to create a new name and address database; and*

*consolidating the new name and address database, wherein said consolidating comprises eliminating records from the new name and address database such that only one record per an e-mail address per an individual in a household remains in the new name and address database.*

*59. The method of claim 58, further comprising:*

*converting a data file comprising contact information to a name and address file and an e-mail file, wherein the name and address file and the e-mail file are usable to create the sorted name and address file and the sorted e-mail file, respectively.*

*60. The method of claim 59, wherein said converting comprises appending at least one new field to each record in the data file and converting the data file into database records.*

*61. The method of claim 58, further comprising, prior to said matching the sorted e-mail file and the sorted name address file:*

*creating the sorted e-mail file by matching the prior version of the name and address database against a standard name and address file and sorting the results by e-mail address; and*

*creating the sorted name and address file by matching a prior version of an email database against an email file and sorting the results by e-mail address.*

*62. The method of claim 58, further comprising:*

*updating the new name and address database based on changes of address.*

*63. The method of claim 62, wherein said updating the new name and address database comprises using United States Postal Service change of address information.*

*64. The method of claim 58, wherein said consolidating comprises:*

*matching a first record in the new name and address database with an incomplete address to a second record in the new name and address database with a complete address; and*

*updating the new name and address database, wherein said updating results in a single record with the complete address instead of the first and the second record.*

*65. The method of claim 64, wherein said matching the first record to the second record comprises:*

*creating a first match code from the first record;*

*creating a second match code from the second record; and*

*matching the first and second match codes.*

*66. The method of claim 65, wherein the first match code is based on a ZIP code, a surname, and a street address.*

*67. The method of claim 65, wherein the first match code is based on a first name, a last name, and a street address.*

*68. A non-transitory, computer accessible storage medium storing program instructions for matching and consolidating addresses in a name and address database, wherein the program instructions are executable to:*

*match one or more records from a sorted e-mail file against one or more records from a sorted name and address file, wherein each record in the sorted e-mail file includes an e-mail address, and wherein each record in the sorted name and address file has at least a valid name or a valid address portion;*

*update the sorted e-mail file by adding to each of said matched records of the sorted e-mail file a name and address from said corresponding matched record from the sorted name and address file;*

*use the updated e-mail file to match records against a prior version of the name and address database to create a new name and address database; and*

*consolidate the new name and address database, wherein said consolidating comprises eliminating records from the new name and address database such that only one record per individual e-mail address remains in the new name and address database.*

*69. The storage medium of claim 68, wherein the program instructions are further executable to:*

*convert a data file comprising contact information to a name and address file and an e-mail file, wherein the name and address file and the e-mail file are usable to create the sorted name and address file and the sorted e-mail file, respectively.*

*70. The storage medium of claim 68, wherein converting the data file comprises appending at least one new field to each record in the data file and converting the data file into database records.*

*71. The storage medium of claim 68, wherein the program instructions are further executable to:*

*create the sorted e-mail file by matching the prior version of the name and address database against a standard name and address file and sorting the results by e-mail address; and*

*create the sorted name and address file by matching a prior version of an email database against an email file and sorting the results by e-mail address.*

*72. The storage medium of claim 68, wherein the program instructions are further executable to:*

*update the new name and address file based on changes of address.*

*73. The storage medium of claim 72, wherein updating the new name and address database comprises using United States Postal Service change of address information.*

*74. The storage medium of claim 68, wherein said consolidating comprises:*

*matching a first record in the new name and address database with an incomplete address to a second record in the new name and address database with a complete address; and*

*updating the new name and address database, wherein said updating results in a single record with the complete address instead of the first and the second record.*

*75. The storage medium of claim 74, wherein said matching the first record to the second record comprises:*

*creating a first match code from the first record;*

*creating a second match code from the second record; and*

*matching the first and second match codes.*

*76. The storage medium of claim 75, wherein the first match code is based on a ZIP code, a surname, and a street address.*

*77. The storage medium of claim 75, wherein the first match code is based on a first name, a last name, and a street address.*

*78. A system for matching and consolidating addresses in a name and address database, comprising:*

*one or more processors; and*

*one or more memory mediums coupled to the one or more processors, wherein the memory mediums store program instructions that are executable by the one or more processors to:*

*match one or more records from a sorted e-mail file against one or more records from a sorted name and address file, wherein each record in the sorted e-mail file includes an e-mail address, and wherein each record in the sorted name and address file has at least a valid name or a valid address portion;*

*update the sorted e-mail file by adding to each of said matched records of the sorted e-mail file a name and address from said corresponding matched record from the sorted name and address file;*

*use the updated e-mail file to match records against a prior version of the name and address database to create a new name and address database; and*

*consolidate the new name and address database, wherein said consolidating comprises eliminating records from the new name and address database such that only one record per an e-mail address per an individual in a household remains in the new name and address database.*

*79. The system of claim 78, wherein the program instructions are further executable to:*

*create the sorted e-mail file by matching the prior version of the name and address database against a standard name and address file and sorting the results by e-mail address; and*

*create the sorted name and address file by matching a prior version of an email database against an email file and sorting the results by e-mail address.*

*80. The system of claim 78, wherein the program instructions are further executable to:*

*update the new name and address file based on changes of address.*

*81. The system of claim 78, wherein said consolidating comprises:*

*matching a first record in the new name and address database with an incomplete address to a second record in the new name and address database with a complete address; and*

*updating the new name and address database, wherein said updating results in a single record with the complete address instead of the first and the second record.*

*82. The system of claim 81, wherein said matching the first record to the second record comprises:*

*creating a first match code from the first record;*

*creating a second match code from the second record; and*

*matching the first and second match codes.*

* * * * *